(12) United States Patent
Keener et al.

(10) Patent No.: US 8,009,236 B2
(45) Date of Patent: Aug. 30, 2011

(54) BROADCAST TRANSMISSION RELAY CIRCUIT

(75) Inventors: David J. Keener, Tulsa, OK (US); John S. Jones, Tulsa, OK (US); Peter L. Ward, Tulsa, OK (US)

(73) Assignee: Level 3 Communications, LLC, Broomfield, CO (US)

( * ) Notice: Subject to any disclaimer, the term of this patent is extended or adjusted under 35 U.S.C. 154(b) by 1268 days.

(21) Appl. No.: 11/591,818

(22) Filed: Nov. 1, 2006

(65) Prior Publication Data

US 2008/0104650 A1    May 1, 2008

(51) Int. Cl.
*H04N 5/38* (2006.01)
(52) U.S. Cl. ......... 348/723; 348/553; 348/555; 348/724
(58) Field of Classification Search ................ 348/723, 348/724, 275, 726, 731, 180, 192, 21, 553–555; 725/32–36; *H04N 5/38*
See application file for complete search history.

(56) References Cited

U.S. PATENT DOCUMENTS

| | | | |
|---|---|---|---|
| 5,600,573 A | 2/1997 | Hendricks et al. | |
| 5,659,353 A * | 8/1997 | Kostreski et al. | 348/21 |
| 6,850,250 B2 | 2/2005 | Hoch | |
| 6,870,886 B2 | 3/2005 | Challapali et al. | |
| 6,904,095 B1 | 6/2005 | Wilkinson et al. | |
| 6,907,881 B2 | 6/2005 | Suki et al. | |
| 6,965,601 B1 | 11/2005 | Nakano et al. | |
| 7,012,964 B1 | 3/2006 | Nakano et al. | |
| 7,046,299 B1 | 5/2006 | Lowe | |
| 7,131,045 B2 | 10/2006 | Guettaf | |
| 7,131,135 B1 | 10/2006 | Virag et al. | |
| 7,256,840 B2 * | 8/2007 | Barreyro et al. | 348/723 |
| 2002/0059651 A1 | 5/2002 | Hirata et al. | |
| 2002/0178454 A1 | 11/2002 | Antoine et al. | |
| 2003/0142129 A1 | 7/2003 | Kleven et al. | |
| 2004/0161031 A1 | 8/2004 | Kwentus et al. | |
| 2005/0076134 A1 | 4/2005 | Bialik et al. | |
| 2005/0212920 A1 | 9/2005 | Evans et al. | |
| 2006/0130107 A1 | 6/2006 | Gonder et al. | |

FOREIGN PATENT DOCUMENTS

| | | |
|---|---|---|
| EP | 0488673 A2 | 6/1992 |
| EP | 1635565 A2 | 3/2006 |
| JP | 2006203738 | 8/2006 |
| WO | PCT/US2007/82515 | 2/2008 |

OTHER PUBLICATIONS

, "Extended European Search Report dated Nov. 2, 2010,", counterpart App. No. 07863510.9, filed Oct. 25, 2007, 6 pages.

* cited by examiner

*Primary Examiner* — Trang U Tran (57) ABSTRACT

A transmission relay circuit, a broadcast signal relay method, and a signal detection device are disclosed. Preferably, the transmission relay circuit includes a microcontroller, a broadcast signal sensing and discerning circuit configured for determining the broadcast signal selected from a group consisting of (NTSC, ASI, DS-3, SDI, and HD-SDI signals). The method preferably includes the steps of determining a signal type, directing the signal to an analog broadcast signal processing circuit when the signal is determined to be to be an analog video signal, directing the signal to a digital broadcast signal processing circuit when the signal is either a digital video signal, or a digital video transport signal, and relaying the processed signal to a local loop provider. The detection device preferably includes at least a multi-layer printed circuit board with an isolation/buffer amplifier and terminator, and a signal detection circuit for detecting and determining the broadcast signal type.

17 Claims, 7 Drawing Sheets

BROADCAST TRANSMISSION RELAY CIRCUIT

FIELD OF THE INVENTION

The claimed invention relates generally to the field of signal transmission and more particularly, but not by way of limitation, to a transmission relay circuit for relaying television broadcast signals delivered by a production company to a local loop provider.

BACKGROUND

Systems and methods for televising events, such as live sporting events, are known and have been in place for at least a half century, and for nearly all of that time analog video signal generation and processing equipment was not only the preferred approach to television broadcasting, it was the only approach to television broadcasting.

Within the North American broadcast market, NTSC analog video signals had been the standard for the broadcast industry since 1940, when the Federal Communications Commission adopted the standard. The processing of NTSC analog video signals into digital signals, such as DS-3 digital video transport signals has been done for a number of years. However, more recently a number of alternate digital signaling technologies have come into use, and have changed the dynamics of how event broadcasts are relayed from their site of generation, such as sports stadiums, to local loop providers. Those alternate signaling technologies include ASI digital video signals, SDI digital video transport signals, and HD-SDI digital video transport signals.

The multiplicity of signal types, i.e., different signal types used for different events, and the use of multiple signal types for single events, created difficulties in configuration control. Not only was the state of the relay equipment in an unknown state from event to event, configuring the equipment in time for event broadcasting became costly, cumbersome, and uncertain.

Accordingly, as market pressures continue to demand higher quality, live, reliable broadcasts (available world wide), challenges remained and needs persist for improvements in methods and apparatuses for use in managing, monitoring, and deploying broadcast relay equipment to meet the increasing usage demands for the equipment.

SUMMARY OF THE INVENTION

In accordance with preferred embodiments, transmission relay circuit for relaying a broadcast signal generated by a broadcast provider to a local loop provider, a method of relaying the broadcast signal generated by the broadcast provider to the local loop provider, and a broadcast signal detection device are provided. The preferred embodiment of the transmission relay circuit preferably includes a microcontroller, and a broadcast signal sensing and discerning circuit communicating with a microcontroller and configured for sensing and reporting a broadcast signal type of the signal received from the broadcast provider, and an analog and digital processing circuit. Preferably, the broadcast provider provides a signal selected from a group consisting of (NTSC analog video signals, ASI digital video signals, and DS-3, SDI, and HD-SDI digital video transport signals).

The analog broadcast signal processing circuit preferably includes an analog video isolation transformer receiving an analog broadcast signal generated by the broadcast provider, a video distribution amplifier communicating with the analog video isolation transformer, an analog video codec communicating with the video distribution amplifier and providing a digital video transport signal to the local loop provider. The digital processing circuit is preferably a direct path between the broadcast signal generated and the local loop provider when the signal is either a digital video signal, or a digital video transport signal. In the preferred embodiment the transmission relay circuit further includes a latching relay responsive to the microcontroller, which switches the analog processing circuit in and out based on the type of signal detected.

In an alternate preferred embodiment, the method of relaying the broadcast signal generated by the broadcast provider to the local loop provider includes at least the steps of receiving the broadcast signal generated by the broadcast provider into a broadcast signal sensing and discerning circuit, and determining a signal type of broadcast signal generated by the broadcast provider. The preferred method further includes directing the broadcast signal to an analog broadcast signal processing circuit when the broadcast signal is determined to be an analog video signal, and directing the broadcast signal to a digital broadcast signal processing circuit when the broadcast signal is determined to be either a digital video signal, or a digital video transport signal.

In an alternative preferred embodiment, a broadcast signal detection device preferably includes at least a multi-layer printed circuit board, and an isolation/buffer amplifier and terminator communicating with the multi-layer printed circuit board, the isolation/buffer amplifier and terminator appearing as a terminated device to a broadcast signal provided to the isolation/buffer amplifier. The alternative preferred embodiment preferably further includes a signal detection circuit, which provides at least a first signal detector communicating with the isolation/buffer amplifier and attached to the multi-layer printed circuit board.

The first signal detector is configured for detecting a type of broadcast signal provided to the isolation/buffer amplifier and selected from a group consisting of (ASI digital video signals, and SDI and HD-SDI digital video transport signals), the first signal detector further provides an ASI status line, a SDI status line, and a HD-SDI status line for reporting the detected signal type.

The alternative preferred embodiment further preferably includes second and third signal detectors, which are used respectively for detecting NTSC analog video signals, and DS-3 digital video transport signal. The second signal detector further preferably provides a NTSC status line, and the third signal detector further preferably provides a DS-3 status line. The alternative preferred embodiment also preferably includes a logic circuit attached to the multi-layer printed circuit board and communicating with each the NTSC, DC-3, ASI, SDI, and HD-SDI status lines, and providing a NTSC output line, and a first LED attached to the multi-layer printed circuit board communicating with the NTSC output line. The NTSC output line preferably illumines the LED when a signal is present on the NTSC status line and not present on the DC-3, ASI, SDI, and HD-SDI status lines.

In a preferred embodiment of the alternative preferred embodiment an encasement is incorporated that enclose the isolation/buffer amplifier, the first, second, and third signal detection circuits, and the logic circuit, while allowing a plurality of LEDS to be visible to a user of the device. The encasement further preferably encloses a battery used to power the electrical component of the device.

These and various other features and advantages that characterize the claimed invention will be apparent upon reading the following detailed description and upon review of the associated drawings.

DESCRIPTION OF THE PREFERRED EMBODIMENTS

Reference will now be made in detail to one or more examples of the invention depicted in the figures. Each example is provided by way of explanation of the invention, and not meant as a limitation of the invention. For example, features illustrated or described as part of one embodiment may be used with another embodiment to yield still a different embodiment. Other modifications and variations to the described embodiments are also contemplated within the scope and spirit of the invention.

Figure 1:
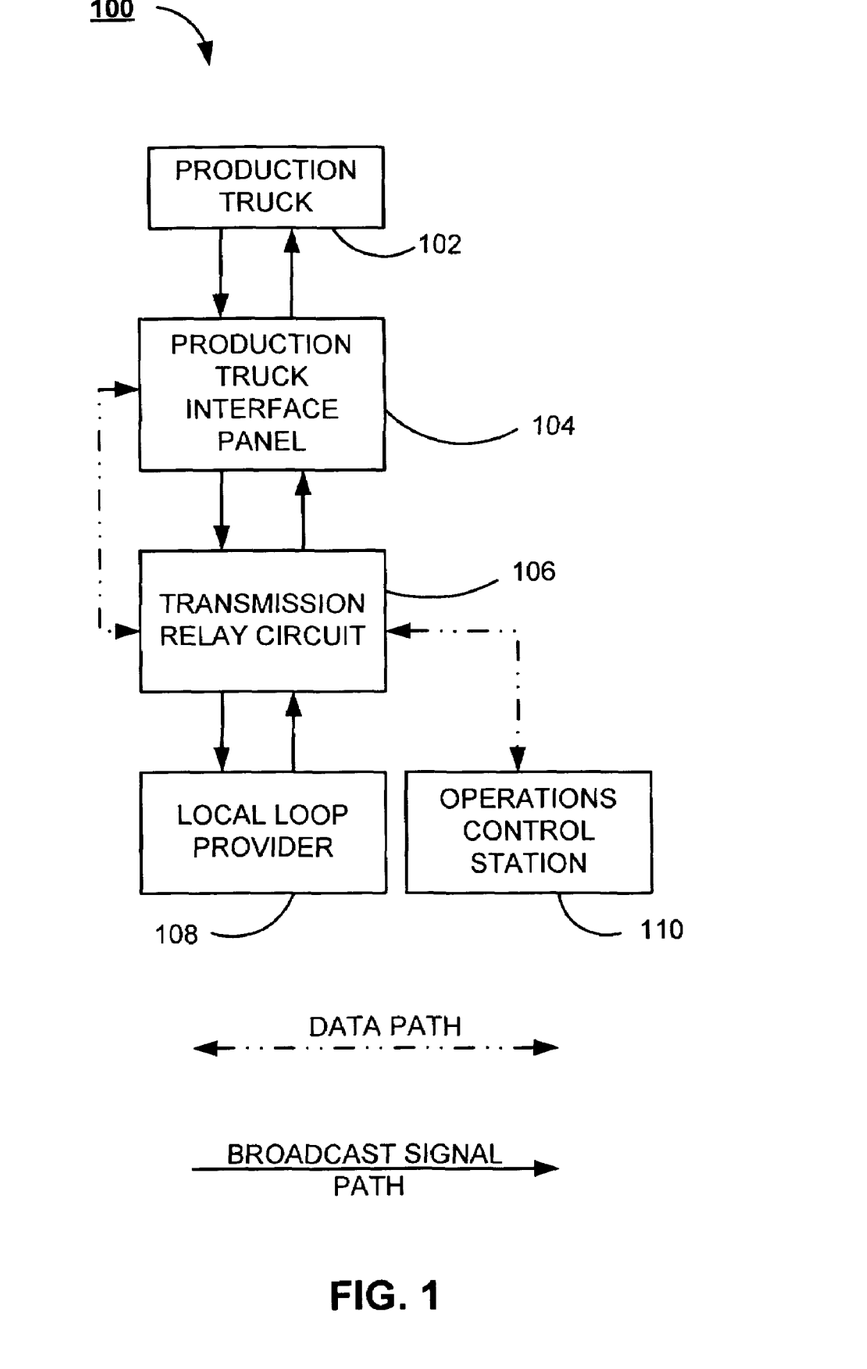
FIG. 1 shows a functional block diagram of an inventive venue broadcast signal processing system for relaying signals received from a television signal provider to a local loop provider.

Referring to the drawings, FIG. 1 shows an inventive venue broadcast signal processing system 100 (also referred to herein as signal processing system 100), for use in providing to a local loop provided, broadcast singles generated by a broadcast signal provider, such as ESPN, FOX, CBS, NBC, and ABC, from their locations at the venue. In a preferred embodiment, the signal processing system 100, further processes broadcast signals received from the local loop provider and provides those signals to the broadcast signal provider. It will be noted that when dealing with video broadcast signals, only unilateral signal paths may be used, as opposed to bidirectional signal paths used in transferring and receiving data. The signal processing system 100 preferably includes a production truck 102, which receives multiple signals from television cameras recording events such as football games, baseball games, hockey games, and other events of interest. Personnel within the production truck 102 make decisions on a continuing basis to determine, which camera shots will be passed on for broadcast.

On a real-time basis, the personnel within the production truck pass selected camera shots in the form of a single broadcast signal and four audio signals, or a broadcast signal with embedded audio to a production truck interface panel 104. The production truck interface panel 104 provides a multitude of channels for receipt of a number of broadcast signals and their accompanying audio signals, and/or a number of broadcast signals with embedded audio. The production truck interface panel 104 also provides broadcast signals along with their accompanying audio, or a broadcast signal with embedded audio to the production truck 102 for their own use, or for use in displaying the transmission on a screen at a sporting event such as a JumboTron in a stadium.

Upon receipt of the broadcast signal from the production truck, the production truck interface panel passes for signal onto a demarcation/equipment cabinet 106. The demarcation/equipment cabinet 106 determines what type of signal is being received from the production truck 102, i.e. whether the signal is a NTSC analog video signal, a DS-3 digital video transport signal, an ASI digital video signal, a SDI digital video transport signal, a HD-SDI digital video transport signal, or other broadcast signal.

Having determined the type of signal being received from the production truck 102, the demarcation/equipment cabinet 106 processes the signal and hands it off to television signal receiving and transmission equipment of a local loop provider 108, such as COX cable. In a preferred embodiment an operations control station 110, is in communication with, and controls operations of the transmission relay circuit 112. Also, a data path connection is preferably provided between the transmission relay circuit 112 and the production truck interface panel 104, to promote access to and a level of control over the production truck interface panel 104 by the operations control station 110.

Figure 2:
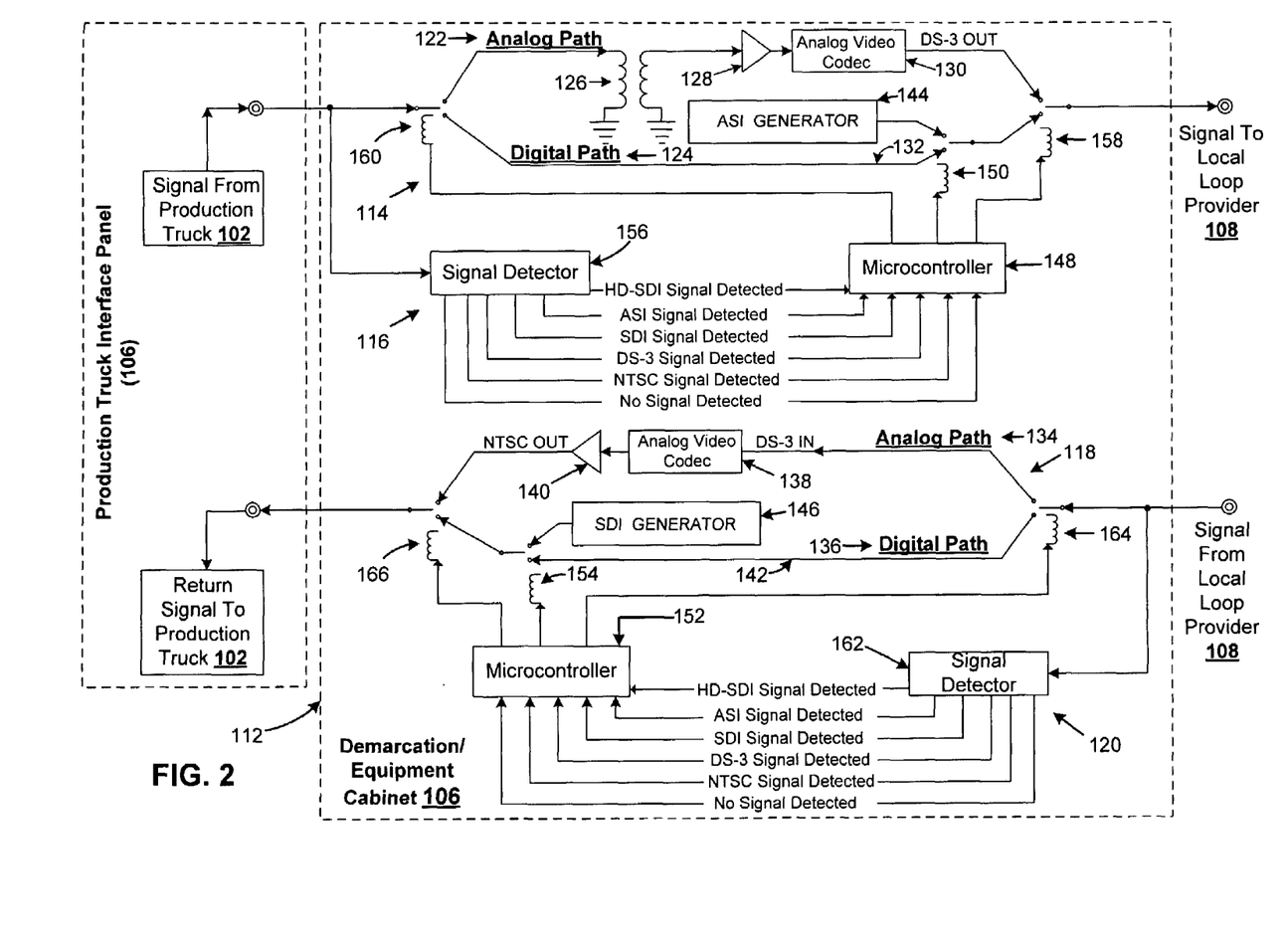
FIG. 2 shows a functional block diagram of a transmission relay circuit of the present invention.

FIG. 2 shows the demarcation/equipment cabinet 106 includes a transmission relay circuit 112. The transmission relay circuit 112 preferably includes four signal processing circuits, such as 114 (one shown), accompanied by four broadcast signal sensing and discerning circuits, such as 116 (one shown). In a preferred embodiment, the transmission relay circuit 112 is preferably configured for servicing signals received from the production truck interface panel 104, and for forwarding those processed signals onto the local loop provider 108.

The transmission relay circuit 112 preferably further includes four return signal processing circuits, such as 118 (one shown), accompanied by four return signal sensing and discerning circuits such as 120 (one shown). The return signal processing circuit 118, and the return sensing and discerning circuits 120 are preferably provided, for servicing signals received from the local loop provider 108, which are processed, and forwarded to the production truck interface panel 104 for delivery to the production truck 102.

In a preferred embodiment the signal processing circuits 114 includes an analog path 122 (also referred to herein as an analog broadcast signal processing circuit 122) and a digital path 124 (also referred to herein as a digital broadcast signal processing circuit 124). The analog path 122 is preferably configured for processing NTSC analog video signals, and the digital path 124 is preferably configured for processing digital video signals, such as ASI digital video signals; and DS-3, SDI, and HD-SDI digital video transport signals. For processing NTSC analog video signals, the analog path 122 preferably includes at least an analog video isolation transformer 126, a video distribution amplifier 128, and an analog video codec 130. The analog video codec 130 outputs a DS-3 analog video transport signal, which is provided to the local loop provider 108. For processing ASI digital video signals; and DS-3, SDI, and HD-SDI digital video transport signals, the digital path 124 preferably includes a conductive path 132 that bypasses the analog path 122 to pass the signal received from production truck interface panel 104 to the local loop provider 108.

In a preferred embodiment the return signal processing circuit 118 includes the analog path 134 and the digital path 136. The analog path 134 is preferably configured for processing DS-3 digital video signals received from the local loop provider 108, and converting the received DS-3 digital video signals into NTSC analog video signals for delivery to the production truck interface panel 104, and onto the production truck 102. The digital path 136 is preferably configured for digital video signals, such as ASI digital video signals; and DS-3, SDI, and HD-SDI digital video transport signals. For processing DS-3 digital video signals, the analog path 134 preferably includes at least an analog video codec 138, and a video distribution amplifier 140. The analog video codec 138 receives DS-3 analog video transport signal and provides NTSC analog video signals. For processing ASI digital video signals; and DS-3, SDI, and HD-SDI digital video transport signals received from the local loop provider 108, the digital path 136 preferably includes a conductive path 142 that bypasses the analog path 134 to pass the signal received from the local loop provider 108, to the production truck interface panel 104, and onto the production truck 102.

Figure 3:
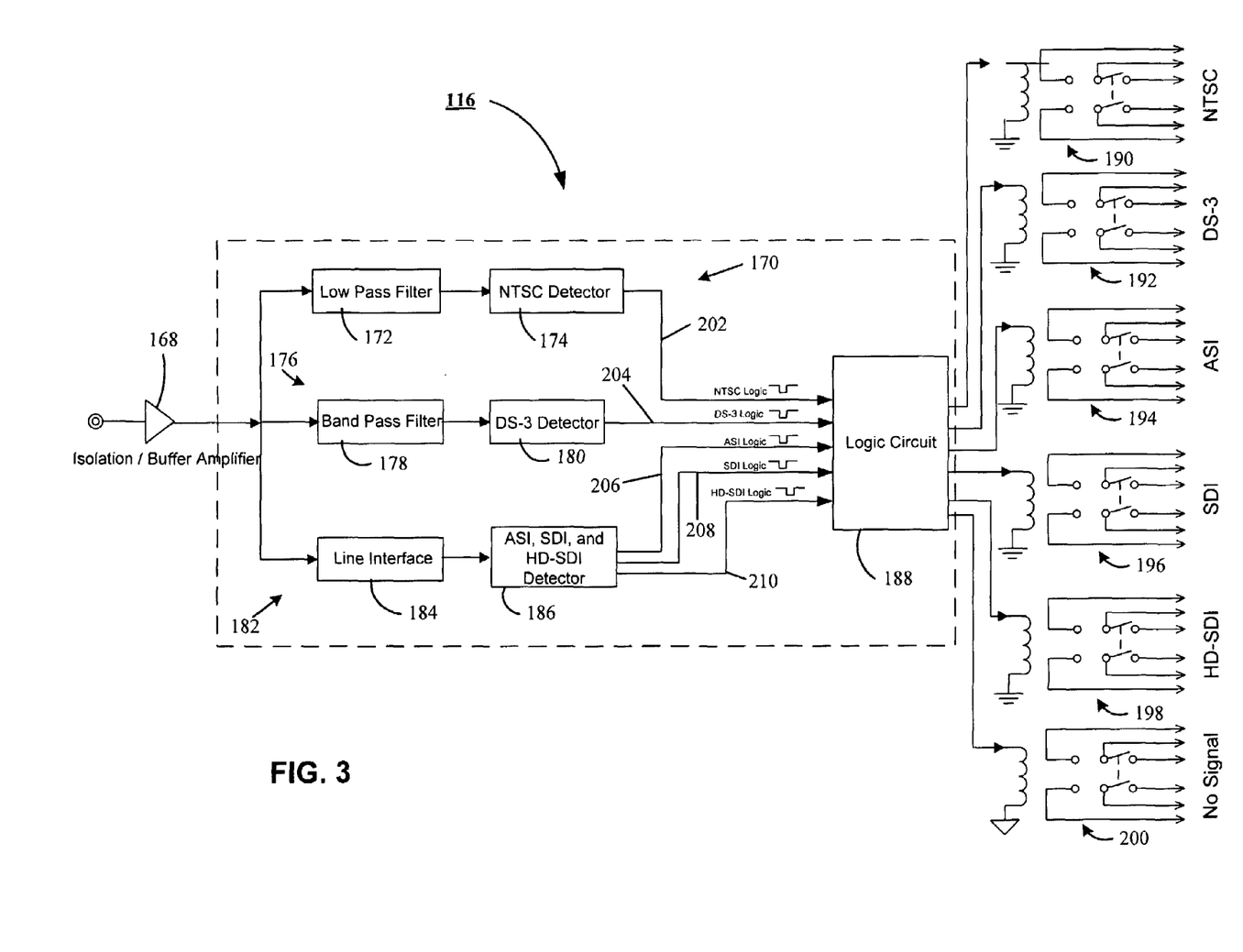
FIG. 3 shows a functional block diagram of a sensing and discerning circuit of the transmission relay circuit of FIG. 2.

FIG. 3 further shows the signal processing circuits 114 preferably further includes an ASI digital video signal generator 144, and the return signal processing circuit 118 preferably further includes a SDI digital video transport signal generator 146. In either case, the signal generators are left in a signal generating mode as long as power is supplied to the transmission relay circuit 112, and are utilized for system testing purposes.

To operate the ASI digital video signal generator 144, a microcontroller 148 of the signal sensing and discerning circuit 116 activates a relay 150, which in a preferred embodiment is a fail safe relay, that is a relay the returns to a known state in response to a loss of power. To operate the SDI digital video transport signal generator 146, a microcontroller 152 of the return signal sensing and discerning circuit 120 activates a relay 154, which in a preferred embodiment is also a fail safe relay. Activation of either the ASI digital video signal generator 144, or the SDI digital video transport signal generator 146 causes a corresponding test signal to be injected into the signal processing system 100 (of FIG. 1).

In addition to the microcontroller 148, the signal sensing and discerning circuit 116 further includes a signal detector 156, which will be covered in greater detail during the discussion of FIG. 3. In a preferred embodiment, the signal detector 156 is configured to determine what type of broadcast signal is being provided by the production truck 102. Upon determining which type of signal is being provided by the production truck 102, the signal detector 156 provides that information to the microcontroller 148.

Based on the signal type determined by the signal detector 156, the microcontroller 148 activates relays 158 and 160, which in a preferred embodiment are latching relays, i.e. relays that remain in the state in which they were last placed. Activation of relays 158 and 160 switches in the analog path 122 when the determined signal is an analog type video signal, and switches in digital path 124 when the determined signal is a digital video type signal.

In addition to the microcontroller 152, the signal sensing and discerning circuit 120 further includes a signal detector 162, which will be covered in greater detail during the discussion of FIG. 3. In a preferred embodiment, the signal detector 156 is configured to determine what type of broadcast signal is being provided by the local loop provider 108. Upon determining which type of signal is being provided by the local loop provider 108, the signal detector 162 provides that information to the microcontroller 152.

Based on the signal type determined by the signal detector 162, the microcontroller 148 activates relays 164 and 166, which in a preferred embodiment are latching relays. Activation of relays 164 and 166 switches in the analog path 122 when the determined signal is DS-3 digital video transport signal, and switches in digital path 136 when the determined signal is an ASI digital signal, a SDI digital video transport signal, or a HD-SDI digital video transport signal.

FIG. 3 shows the signal sensing and discerning circuit 116 includes an isolation/buffer amplifier 168, which is selected to appear as a high impedance device to the signal received from the production truck 102 (of FIG. 1). The isolation/buffer amplifier 168 passes the signal received from the production truck 102 to: a NTSC signal analysis circuit 170, which includes a low bypass filter 172 and a NTSC signal detector 174; a DS-3 signal analysis circuit 176, which includes a band pass filter 178, and a DS-3 signal detector 180; and a combination ASI, SDI, and HD-SDI signal analysis circuit 182, which includes a line interface 184, and a combination ASI, SDI, and HD-SDI signal detector 186.

The signal sensing and discerning circuit 116 further includes the logic circuit 188. The logic circuit 188 works in conjunction with the NTSC signal analysis circuit 170, the DS-3 signal analysis circuit 176; and the a combination ASI, SDI, and HD-SDI signal analysis circuit 182 to determine the type of signal that is being received from the production truck 102.

The logic circuit 188 provides an output signal to a NTSC relay 190 reporting the presence of a NTSC analog video signal type of broadcast signal when the logic circuit 188 receives a signal from the NTSC signal analysis circuit 170, and no signals from the DS-3 signal analysis circuit 176, or the combination ASI, SDI, and HD-SDI signal analysis circuit 182.

The logic circuit 188 provides an output signal to a DS-3 relay 192 reporting the presence of a DS-3 digital video transport signal type of broadcast signal when the logic circuit 188 receives a signal from the DS-3 signal analysis circuit 176, and no signals from the NTSC signal analysis circuit 170, or the combination ASI, SDI, and HD-SDI signal analysis circuit 182.

The logic circuit 188 provides an output signal to an ASI relay 194 reporting the presence of an ASI digital video signal type of broadcast signal when the logic circuit 188 receives an ASI signal from the combination ASI, SDI, and HD-SDI signal analysis circuit 182, and no signal from the NTSC signal analysis circuit 170, or the DS-3 signal analysis circuit 176.

The logic circuit 188 provides an output signal to a SDI relay 196 reporting the presence of a SDI digital video transport signal type of broadcast signal when the logic circuit 188 receives an SDI signal from the combination ASI, SDI, and HD-SDI signal analysis circuit 182, and no signal from the NTSC signal analysis circuit 170, or the DS-3 signal analysis circuit 176.

The logic circuit 188 provides an output signal to a HD-SDI relay 198 reporting the presence of a HD-SDI digital video transport signal type of broadcast signal when the logic circuit 188 receives an HD-SDI signal from the combination ASI, SDI, and HD-SDI signal analysis circuit 182, and no signal from the NTSC signal analysis circuit 170, or the DS-3 signal analysis circuit 176.

The logic circuit 188 provides an output signal to a No Signal relay 200 reporting no signal present if no signals are present from the NTSC signal analysis circuit 170, the DS-3 signal analysis circuit 176, or the combination ASI, SDI, and HD-SDI signal analysis circuit 182. The logic circuit 188 further provides an output signal to the No Signal relay 200 reporting no signal present if a signal is present on any two or more of the NTSC signal analysis circuit 170, the DS-3 signal analysis circuit 176, and the combination ASI, SDI, and HD-SDI signal analysis circuit 182.

FIG. 3 further shows: the NTSC signal detector 174 provides a NTSC status line 202 for providing a status signal to the logic circuit 188, when a NTSC analog video signal is detected; the DS-3 signal detector 180 provides a DS-3 status line 204 for providing a status signal to the logic circuit 188, when a DS-3 digital video transport signal is detected; and a combination ASI, SDI, and HD-SDI provides an ASI status line 206 for providing a status signal to the logic circuit 188, when an ASI digital video signal is detected, and a SDI status line 208 for providing a status signal to the logic circuit 188, when a SDI digital transport signal is detected, and a HD-SDI status line 210 for providing a status signal to the logic circuit 188, when a HD-SDI digital transport signal is detected.

Figure 4:
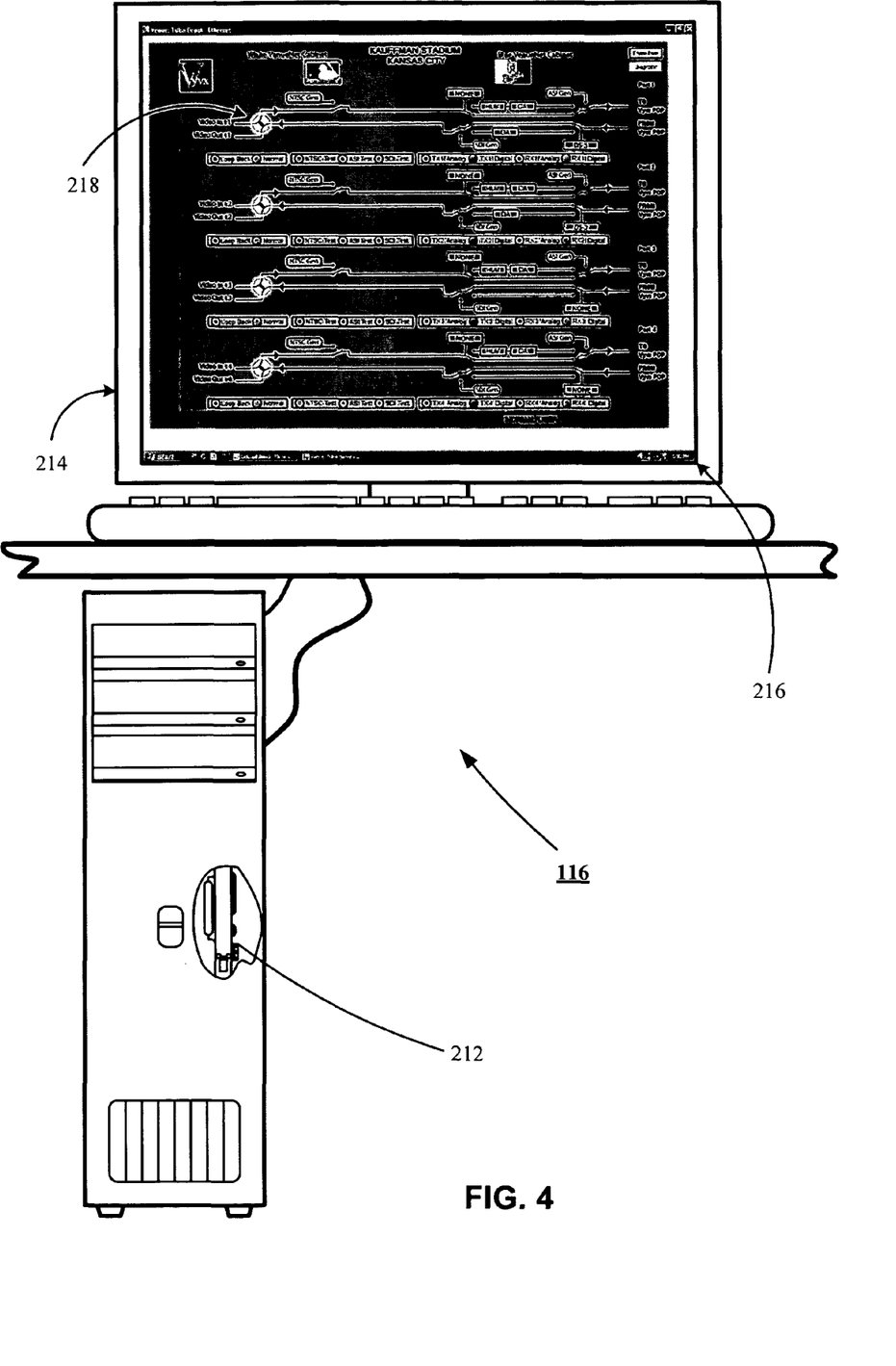
FIG. 4 shows a partial cutaway, elevation view of an operations station of the inventive venue broadcast signal processing system of FIG. 1.

The operations control station 110 shown by FIG. 4 preferably includes a microprocessor 212 communicating with the transmission relay circuit 112 (of FIG. 2), configuration control software (not shown separately) loaded on the microprocessor 212, a display 214 responsive to the microprocessor 212, in a graphical user interface 216 provided by the configuration control software and displayed on the display 214. The graphical user interface 216 provides a relay symbol 218, which when clicked or activated by a user provides an input to the configuration control software, to issue a command to the transmission relay circuit 112 to switch the signal processing circuit 114 (of FIG. 2) to a configuration consistent with the type of broadcast signal determined by the signal sensing and discerning circuit 116.

Figure 5:
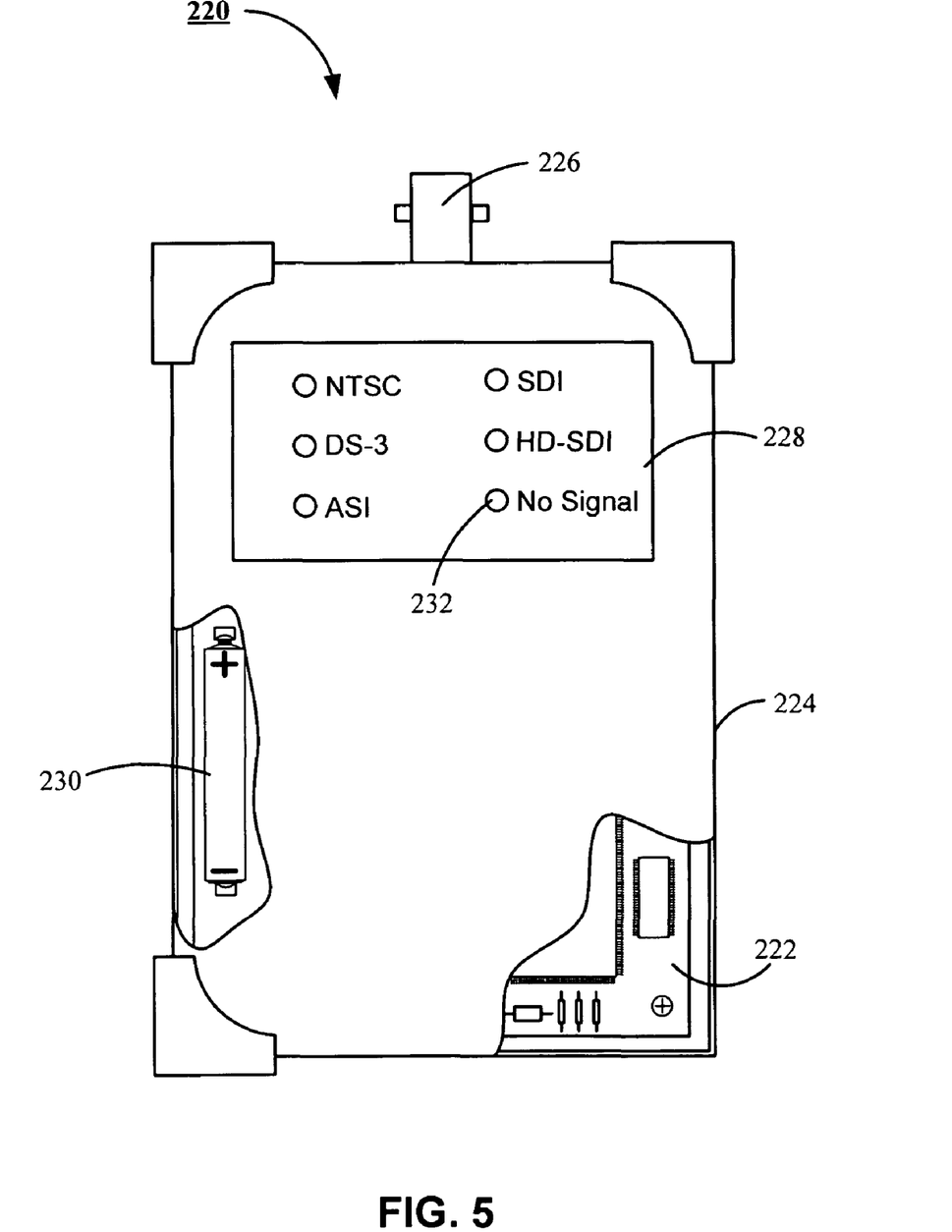
FIG. 5 illustrates a partial cutaway front elevation view of the signal of the present invention.

FIG. 5 shows a broadcast signal detection device 220, which in a preferred embodiment includes a multi-layer printed circuit board 222, a housing 224, a connector 226, a display panel 228, a battery 230, and an LED 232 associated with each type of broadcast signal detected for reporting the signal type detected, and a condition of no signal present. It is noted that in a preferred embodiment the LED 232 associated with the No Signal condition will report no signal when no signal has been detected, or when more than one signal type has been detected.

In a preferred embodiment the multi-layer printed circuit board 222, is a three layer board with ground planes separating each layer. The purpose for the ground layers is to provide protection against cross-talk between the three layers. Preferably, one of the three layers supports the processing of NTSC analog video signals, another supports the processing of DS-3 digital video transport signals, and the third supports ASI digital video signals; SDI digital video transport signals, and HD-SDI digital video transport signals.

Figure 6:
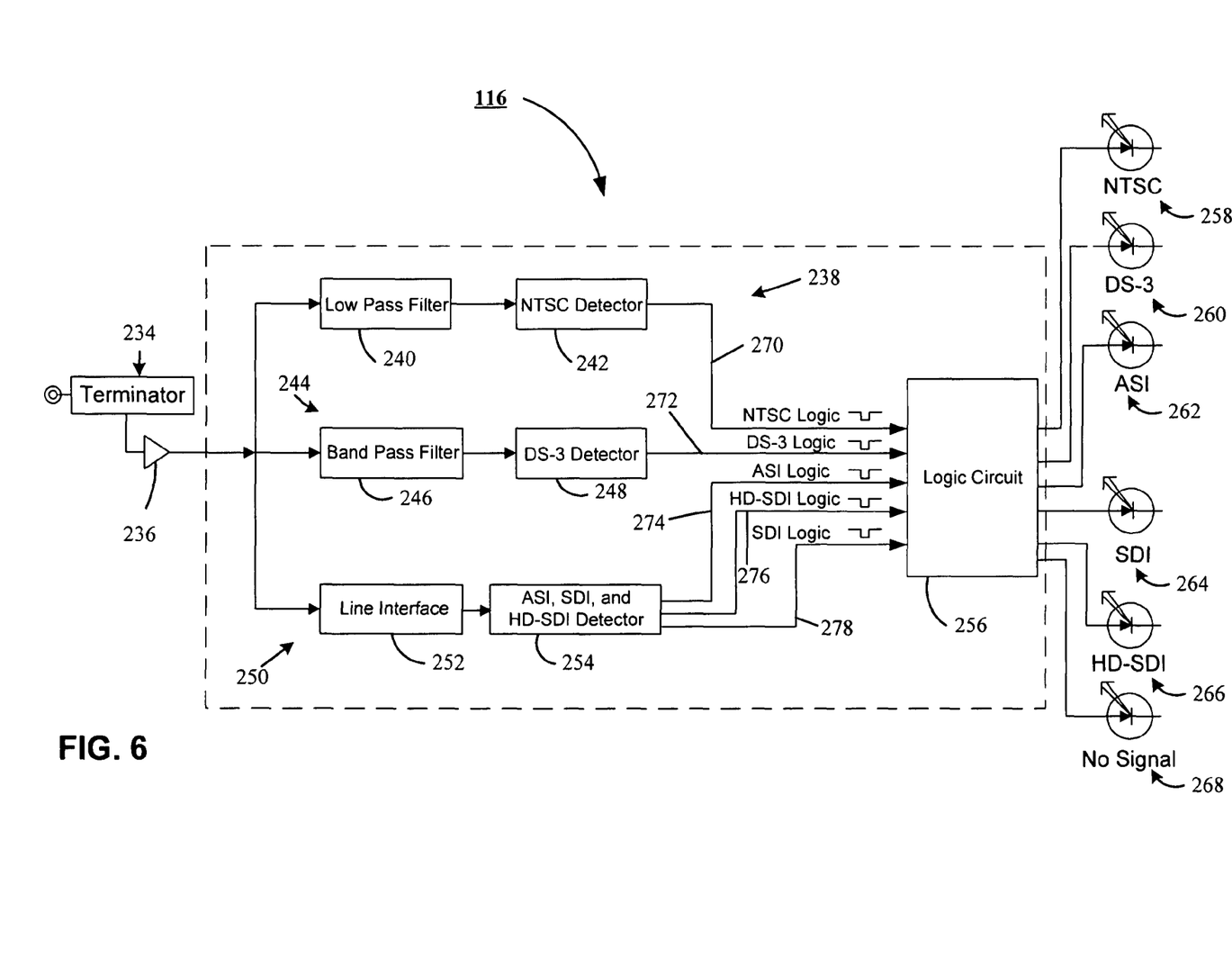
FIG. 6 shows a functional block diagram of the signal detection device of FIG. 5.

FIG. 6 shows the functional block diagram of the broadcast signal detection device 220 to include a terminator 234 providing the broadcast signal being detected to an isolation/ buffer amplifier 236, which is selected to appear as a high impedance device to the signal received from the production truck 102 (of FIG. 1). The isolation/buffer amplifier 236 passes the signal received from the production truck 102 to: a NTSC signal analysis circuit 238, which includes a low bypass filter 240 and a NTSC signal detector 242; a DS-3 signal analysis circuit 244, which includes a band pass filter 246, and a DS-3 signal detector 248; and a combination ASI, SDI, and HD-SDI signal analysis circuit 250, which includes a line interface 252, and a combination ASI, SDI, and HD-SDI signal detector 254.

The signal sensing and discerning circuit 116 further includes the logic circuit 256. The logic circuit 256 works in conjunction with the NTSC signal analysis circuit 238, the DS-3 signal analysis circuit 244; and the combination ASI, SDI, and HD-SDI signal analysis circuit 250 to determine the type of signal that is being received from the production truck 102.

The logic circuit 256 provides an output signal to a NTSC-LED 258 reporting the presence of a NTSC analog video signal type of broadcast signal when the logic circuit 256 receives a signal from the NTSC signal analysis circuit 238, and no signals from the DS-3 signal analysis circuit 244, or the combination ASI, SDI, and HD-SDI signal analysis circuit 250.

The logic circuit 188 provides an output signal to a DS-3-LED 260 reporting the presence of a DS-3 digital video transport signal type of broadcast signal when the logic circuit 256 receives a signal from the DS-3 signal analysis circuit 244, and no signals from the NTSC signal analysis circuit 238, or the combination ASI, SDI, and HD-SDI signal analysis circuit 250.

The logic circuit 256 provides an output signal to an ASI-LED 262 reporting the presence of an ASI digital video signal type of broadcast signal when the logic circuit 256 receives an ASI signal from the combination ASI, SDI, and HD-SDI signal analysis circuit 250, and no signal from the NTSC signal analysis circuit 170, or the DS-3 signal analysis circuit 244.

The logic circuit 256 provides an output signal to a SDI-LED 264 reporting the presence of a SDI digital video transport signal type of broadcast signal when the logic circuit 256 receives an SDI signal from the combination ASI, SDI, and HD-SDI signal analysis circuit 250, and no signal from the NTSC signal analysis circuit 170, or the DS-3 signal analysis circuit 244.

The logic circuit 256 provides an output signal to a HD-SDI-LED 266 reporting the presence of a HD-SDI digital video transport signal type of broadcast signal when the logic circuit 256 receives an HD-SDI signal from the combination ASI, SDI, and HD-SDI signal analysis circuit 250, and no signal from the NTSC signal analysis circuit 170, or the DS-3 signal analysis circuit 244.

The logic circuit 188 provides an output signal to a No Signal-LED 268 reporting no signal present if no signals are present from the NTSC signal analysis circuit 238, the DS-3 signal analysis circuit 244, or the combination ASI, SDI, and HD-SDI signal analysis circuit 250. The logic circuit 256 further provides an output signal to the No Signal-LED 268 reporting no signal present if a signal is present on any two or more of the NTSC signal analysis circuit 238, the DS-3 signal analysis circuit 244, and the combination ASI, SDI, and HD-SDI signal analysis circuit 250.

FIG. 6 further shows: the NTSC signal detector 242 provides a NTSC status line 270 for providing a status signal to the logic circuit 256, when a NTSC analog video signal is detected; the DS-3 signal detector 248 provides a DS-3 status line 272 for providing a status signal to the logic circuit 256, when a DS-3 digital video transport signal is detected; and a combination ASI, SDI, and HD-SDI provides an ASI status line 274 for providing a status signal to the logic circuit 256, when an ASI digital video signal is detected, and a SDI status line 276 for providing a status signal to the logic circuit 256, when a SDI digital transport signal is detected, and a HD-SDI status line 278 for providing a status signal to the logic circuit 256, when a HD-SDI digital transport signal is detected.

Figure 7:
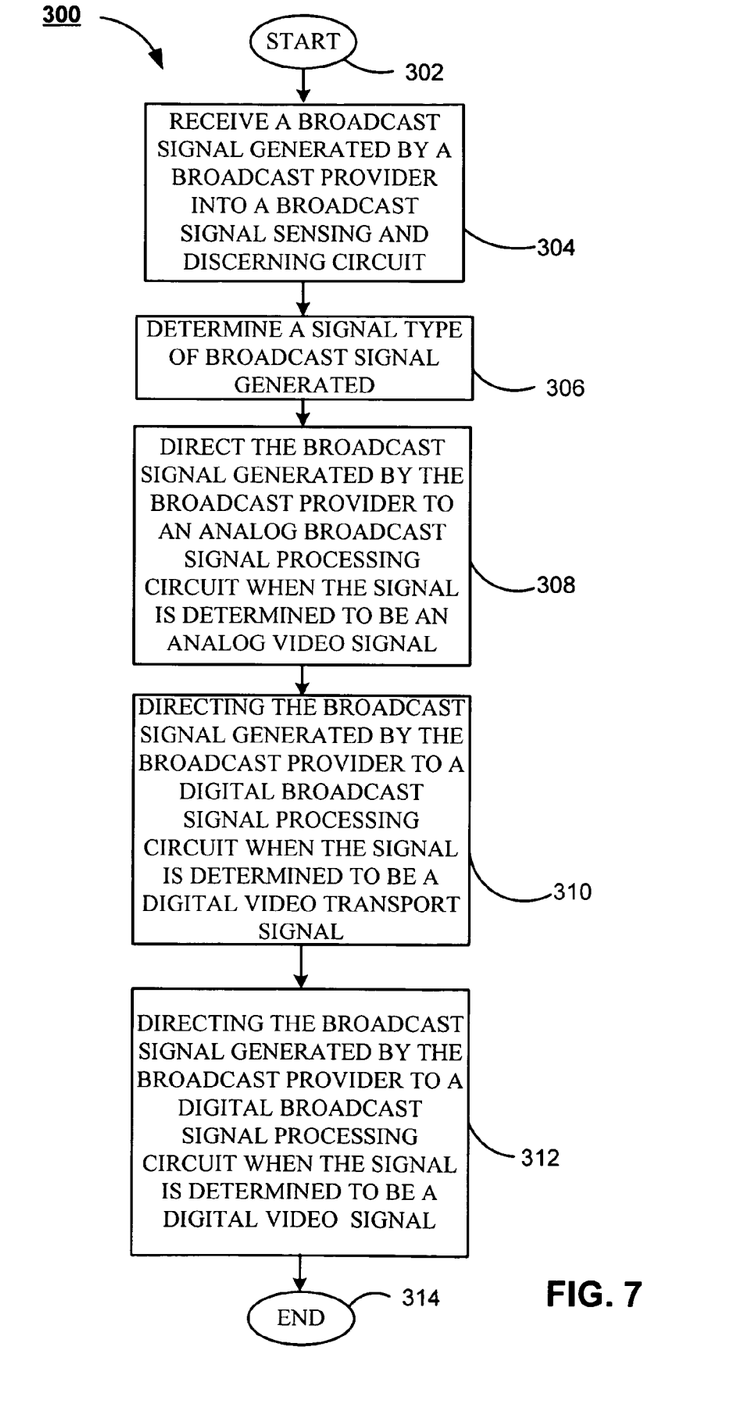
FIG. 7 illustrates a flow diagram of using the present invention.

Turning now to FIG. 7, shown therein is a flow chart 300, which depicts a method of relaying a broadcast signal generated by a broadcast provider and received from a production truck (such as 102), to a local loop provider (such as 108). The method commences at start process step 302, and proceeds to process step 304, with receiving the broadcast signal generated by the broadcast provider into a broadcast signal sensing and discerning circuit (such as 116) of a transmission relay circuit (such as 106). At process step 306, the method proceeds with determining a signal type of broadcast signal generated by the broadcast provider with the broadcast signal sensing and discerning circuit. At process step 308, the method continues with, directing the broadcast signal generated by the broadcast provider to an analog broadcast signal processing circuit (such as 122), with a microcontroller (such as 148) of the transmission relay circuit when the broadcast signal sensing and discerning circuit determines the broadcast signal generated by the broadcast provider to be an analog video signal. At process step 310, the method continues with directing the broadcast signal generated by the broadcast provider to a digital broadcast signal processing circuit (such as 124) when the broadcast signal sensing and discerning circuit determines the broadcast signal generated by the broadcast provider to be a digital video transport signal.

At process step 312, the method proceeds with directing the broadcast signal generated by the broadcast provider to a digital broadcast signal processing circuit when the broadcast signal sensing and discerning circuit determines the broadcast signal generated by the broadcast provider to be a digital video signal, and the method concludes at end process step 314.

With respect to the above description, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

It will be clear that the present invention is well adapted to attain the ends and advantages mentioned as well as those inherent therein. While presently preferred embodiments have been described for purposes of this disclosure, numerous changes may be made which will readily suggest themselves to those skilled in the art and which are encompassed by the appended claims.

What is claimed is:

1. A transmission relay circuit for relaying a broadcast signal generated by a broadcast provider to a local loop provider, the transmission relay circuit comprising:
    a microcontroller; and
    a broadcast signal sensing and discerning circuit communicating with the microcontroller and configured for sensing and reporting a broadcast signal type of the signal received from the broadcast provider, wherein the broadcast signal sensing and discerning circuit comprises:
        an isolation/buffer amplifier communicating with the broadcast signal generated by the broadcast provider;
        a signal detector portion communicating with the isolation/buffer amplifier for detecting a type of broadcast signal generated by the broadcast provider;
        a logic circuit portion communicating with the signal detector for receiving a signal from the signal detector corresponding to the type of broadcast signal detected by the signal detector; and
        a relay responsive to the logic circuit and providing an output signal corresponding to the type of broadcast signal detected by the signal detector.

2. The transmission relay circuit of claim 1, in which the broadcast signal type received from the broadcast provider is selected from a group consisting of (NTSC analog video signals, ASI digital video signals, and DS-3, SDI, and HD-SDI digital video transport signals).

3. The transmission relay circuit of claim 1, further comprising an analog broadcast signal processing circuit.

4. The transmission relay circuit of claim 1, further comprising a digital broadcast signal processing circuit.

5. The transmission relay circuit of claim 1, further comprising an ASI digital video signal generating circuit.

6. The transmission relay circuit of claim 1, further comprising a SDI digital video transport signal generating circuit.

7. The transmission relay circuit of claim 3, in which the analog broadcast signal processing circuit comprising:
    an analog video isolation transformer receiving an analog broadcast signal generated by the broadcast provider;
    a video distribution amplifier communicating with the analog video isolation transformer; and
    an analog video codec communicating with the video distribution amplifier and providing a digital video transport signal to the local loop provider.

8. The transmission relay circuit of claim 7, further comprising a relay disposed between and communicating with the broadcast single generated by the broadcast provider and the analog video isolation transformer.

9. The transmission relay circuit of claim 8, in which the relay comprises a latching relay responsive to the microcontroller.

10. The transmission relay circuit of claim 4, in which the digital broadcast signal processing circuit comprising a conductive path configured for receiving a digital video signal generated by the broadcast provider and providing the digital video signal generated by the broadcast provider to the local loop provider.

11. The transmission relay circuit of claim 10, further comprising a relay disposed between the generated digital video signal and the conductive path.

12. The transmission relay circuit of claim 11, in which the relay comprises a latching relay responsive to the microcontroller.

13. The transmission relay circuit of claim 12, in which the digital video signal is a digital video transport signal.

14. The transmission relay circuit of claim 1, in which the signal detector portion comprising a NTSC analog video signal detector and a NTSC status line communicating with the logic circuit portion, and in which the logic circuit portion receives a signal across the NTSC status line when the broadcast provider provides a NTSC analog video signal type of broadcast signal to the isolation/buffer amplifier.

15. The transmission relay circuit of claim 14, in which the signal detector portion comprising a DS-3 digital video transport signal detector and a DS-3 status line communicating with the logic portion, and in which the logic circuit portion receives a signal across the DS-3 status line when the broadcast provider provides a DS-3 digital video transport signal type of broadcast signal to the isolation/buffer amplifier.

16. The transmission relay circuit of claim 15, in which the signal detector portion comprising a combination ASI digital video signal, and SDI and HD-SDI digital video transport signal detector with each an ASI status line, a SDI status line, and a HD-SDI status line, and in which the logic circuit portion receives a signal:
    across the ASI status line when the broadcast provider provides an ASI digital video signal type of broadcast signal to the isolation/buffer amplifier; else
    across the SDI status line when the broadcast provider provides a SDI digital video transport signal type of broadcast signal to the isolation/buffer amplifier; else
    across the HD-SDI status line when the broadcast provider provides a HD-SDI digital video transport signal type of broadcast signal to the isolation/buffer amplifier.

17. The transmission relay circuit of claim 16, in which the logic circuit portion provides an output signal to the relay reporting the presence of:
    the NTSC analog video signal type of broadcast signal when the logic circuit portion receives a signal across the NTSC status line and no signals across the DS-3, ASI, SDI, and HD-SDI status lines; else the DS-3 digital video transport signal type of broadcast signal when the logic circuit portion receives a signal across the DS-3 status line and no signals across the NTSC, ASI, SDI, and HD-SDI status lines; else the ASI digital video signal type of broadcast signal when the logic circuit portion receives a signal across the ASI status line and no signals across the NTSC, DS-3, SDI, and HD-SDI status lines; else the SDI digital video transport signal type of broadcast signal when the logic circuit portion receives a signal across the SDI status line and no signals across the NTSC, ASI, DS-3, and HD-SDI status lines; else the HD-SDI digital video transport signal type of broadcast signal when the logic circuit portion receives a signal across the HD-SDI status line and no signals across the NTSC, ASI, DS-3, and SDI status lines.

* * * * *